United States Patent [19]

Scott

[11] Patent Number: 5,105,963
[45] Date of Patent: Apr. 21, 1992

[54] DEVICE FOR HOLDING A COOKING UTENSIL

[76] Inventor: Wayne Scott, Rte. Box 438, Saunemin, Ill. 61769

[21] Appl. No.: 516,457

[22] Filed: Apr. 30, 1990

[51] Int. Cl.⁵ ............................................ B65D 25/28
[52] U.S. Cl. ................................. 220/735; 220/912; 220/94 R
[58] Field of Search ............ 220/85 D, 912, 96, 94 R, 220/94 A

[56] References Cited

U.S. PATENT DOCUMENTS

| 315,989 | 4/1885 | Ziph | 220/912 |
| 769,119 | 8/1904 | Strickland | 220/912 |
| 846,010 | 3/1957 | Corbell | 220/912 |
| 2,515,617 | 7/1950 | Tiford | 220/912 |

Primary Examiner—Joseph Man-Fu Moy
Attorney, Agent, or Firm—Willian Brinks Olds Hofer Gilson & Lione

[57] ABSTRACT

A holder for supporting one end of a utensil or the like above a surface of a container having an opening.

8 Claims, 2 Drawing Sheets

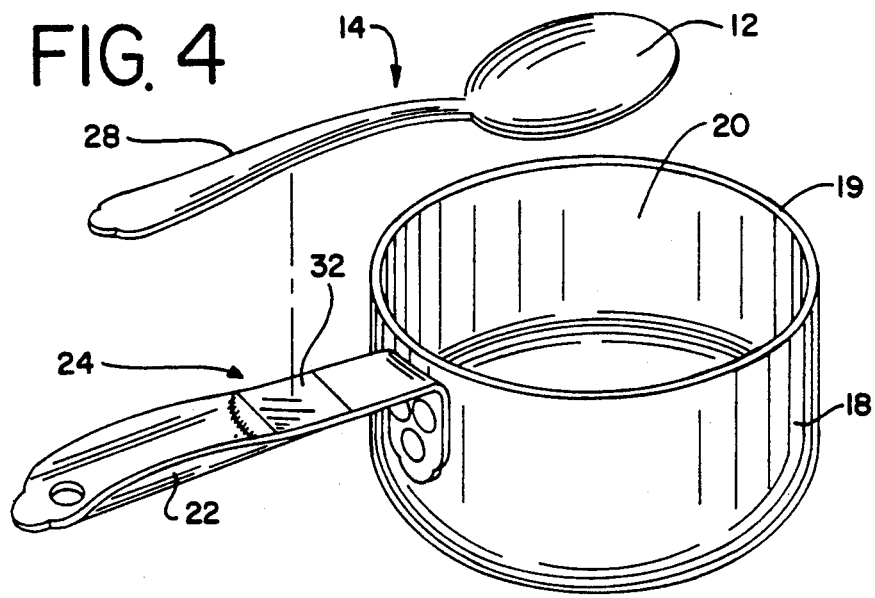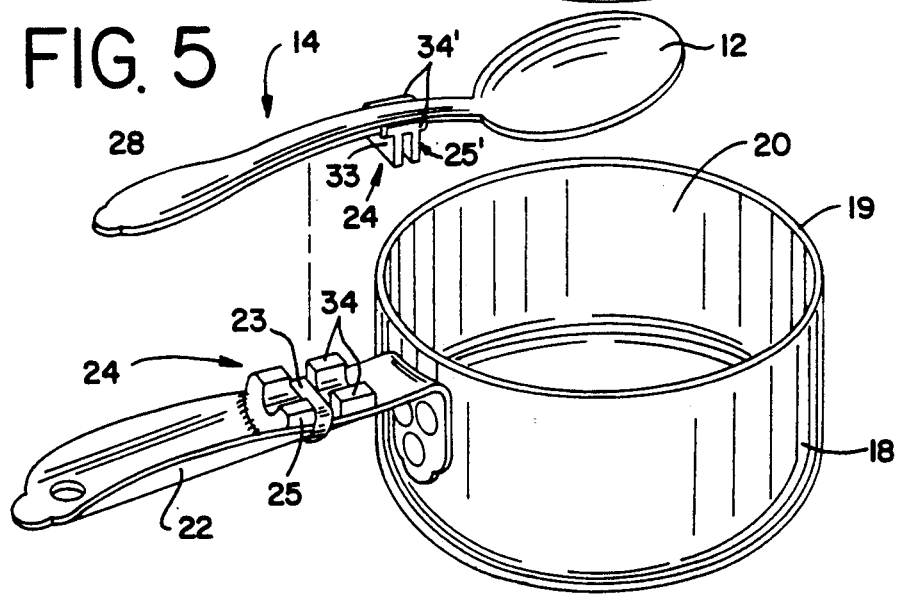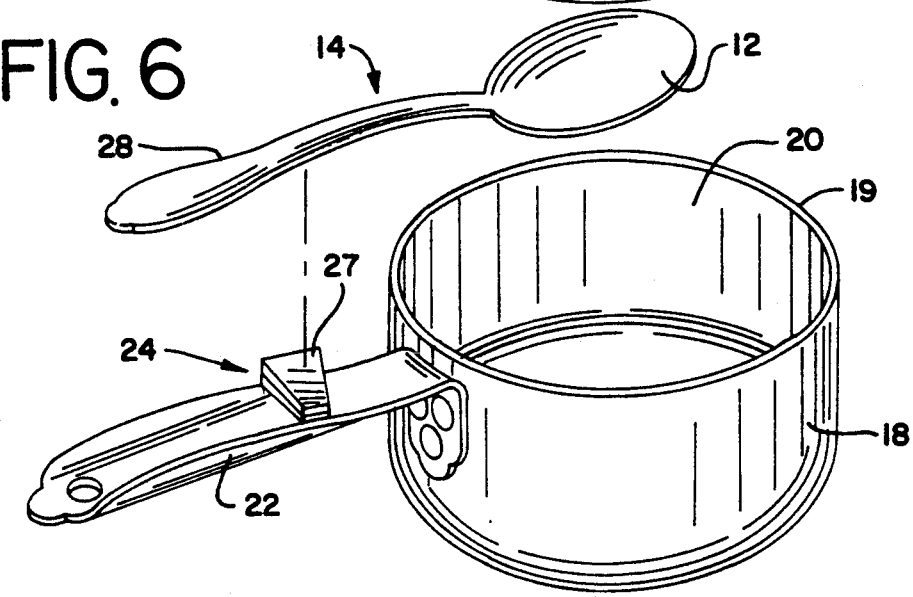

DEVICE FOR HOLDING A COOKING UTENSIL

FIELD OF THE INVENTION

The present invention relates generally to cooking utensil holders for open containers, and more particularly to a cooking utensil holder for securing a cooking utensil to a pot, pan or other cooking container handle where the utensil cooking end is positioned above the open container.

BACKGROUND OF THE INVENTION

Handling food spillage and dripping from the end of a kitchen utensil, such as a spoon, after stirring the contents of a pot, pan or cooking container has long been a problem. One solution for example, has been to place a dish on the stove or an adjacent surface, into which the wet end of the utensil is placed. Unfortunately, movement of the utensil from the cooking container across the stove allows drips and spills from the utensil cooking end to splash on the stove and create a food-splattered stove surface. The dish also collects spillage, and must be cleaned.

SUMMARY OF THE INVENTION

It is accordingly a principal objective of the present invention to provide a holder to releasably fasten a cooking utensil to a pot, pan or container in a manner that permits food on the wet or "cooking" end of the utensil to drip back into the container. It is a more particular objective to provide a holder to releasably fasten a cooking utensil to a pot, pan or container handle, with the cooking end of the utensil supported above the open container.

To these and other ends, the present invention generally comprises a device which fastens a cooking utensil to a pot, pan or container with the cooking end of the utensil supported above the open container. The device permits the utensil to be easily fastened or unfastened from the container, and can be provided as a mount secured to or formed on the container or the utensil itself.

In one expression of the invention, the holder comprises a utensil mount secured to the container, as on the handle. Some means is carried by the mount to releasably grasp and hold one end of the utensil in a manner to cantilever the other end of the utensil over the open container. In one form, the mount includes a mechanical or an elastic fastener to releasably secure the mount to the container handle. In another form, the container handle includes material susceptible to magnetic attraction, and the mount includes a magnet having a sufficient magnetic strength to support the utensil on the handle.

More particularly, the mount of one embodiment has a first band which is wrapped about the container handle, and the means carried by the mount comprises a second band which is wrapped about one end of the utensil. Each of the bands, which may be elastic or the like, further include a section of interengagable hook and loop fastening material.

In another embodiment, the holder comprises a mount having a magnet of sufficient magnetic strength to support a ferrous utensil on the handle. An elastic loop is carried by the mount which slides over the container handle to fix the magnet in place. For example, the mount has a base with a pair of posts extending from opposite sides of the base. The elastic loop is a rubber band which has ends looped over the posts with the rubber band being drawn taut therebetween. The ferrous utensil is then releasably held by the magnet. Alternatively, the magnet can be used to hold the mount on the container handle, with the utensil then slid under the loop.

In yet another expression of the invention, a cooking implement comprises a container having an opening, a handle formed adjacent the container opening, and a magnet, spring clip or resilient clamp formed integral with the handle. The magnet in the handle would cooperate with an iron-bearing utensil. Alternatively, a magnet spring clip or resilient clamp could be formed integral with the utensil. The holder-bearing utensil would then attach to the container handle or lip.

The holder of this invention provides important advantages. The utensil may be easily attached or removed from the container handle. The design is well suited to be added to existing containers or incorporated into newly manufactured containers. The holder may be easily affixed to, and included on, containers having handles of many materials, such as metal, wood, plastic and ceramic.

Further understanding of the invention, how it achieves the stated objectives, and its advantages can be obtained from consideration of the following detailed description of embodiments of the invention taken in conjunction with the drawings, in which:

BRIEF DESCRIPTION OF THE DRAWINGS

FIG. 4 is a perspective view of a fourth embodiment of a utensil holder for a container handle made in accordance with the invention;

FIG. 5 is a perspective view of a fifth and sixth embodiment of a utensil holder for a container handle made in accordance with the invention; and FIG. 6 is a perspective view of another embodiment of a utensil holder for a container made in accordance with the invention.

DETAILED DESCRIPTION OF EMBODIMENTS OF THE INVENTION

Figure 1:
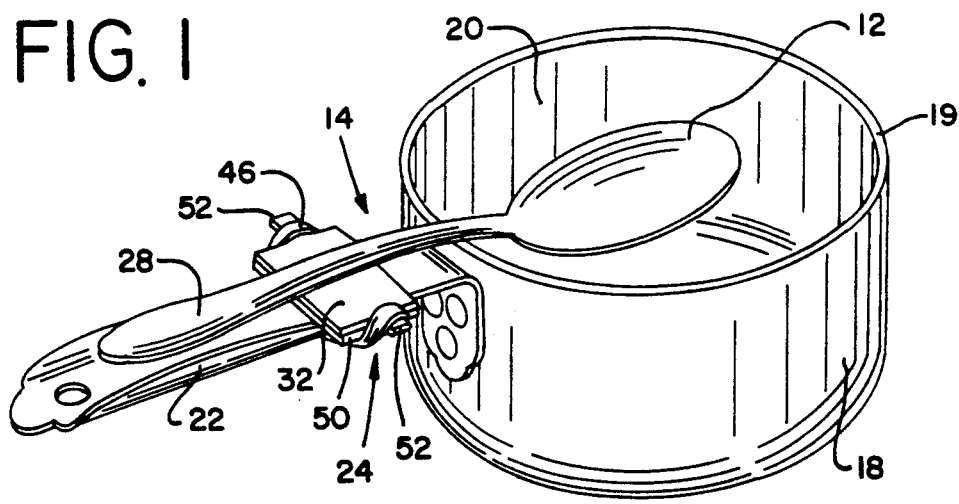
FIG. 1 is a perspective view of one embodiment of a utensil holder for a container handle made in accordance with the invention.

Referring now to the drawings, FIGS. 1-6 show a variety of holders for supporting the cooking end 12 of a cooking utensil 14 above a container 18 defining a rim 19 and top opening 20. The container 18 has a handle 22 extending from near the opening 20 of the container 18.

As described hereinafter, various grasping and holding elements are carried by a utensil mount 24 to releasably grasp and hold the handle end 28 of the utensil 14 in a manner to cantilever the other end 12 of the utensil 14 over the opening 20 of the container 18. Other embodiments have the holder 10 formed integral with one of the utensil 14 or the handle 22, and may exclude the need for interengagable elements.

In the embodiment shown in FIG. 1, the mount 24 is secured to the handle 22 with a rubber band loop 46. It has a base 50 with a pair of posts 52 extending from opposite sides of the base 50. An upwardly facing magnet 32 is fixed to the base 50, as by gluing. The utensil handle 28 is made of material susceptible to magnetic attraction, e.g., iron. The rubber band 46 has ends which are looped over the mount posts 52, with the rubber band being drawn taut therebetween. In use, the loop is simply slipped over the handle 22 to hold the mount 24 in place. The ferrous utensil may then be readily attached or detached from handle 22.

Figure 2:
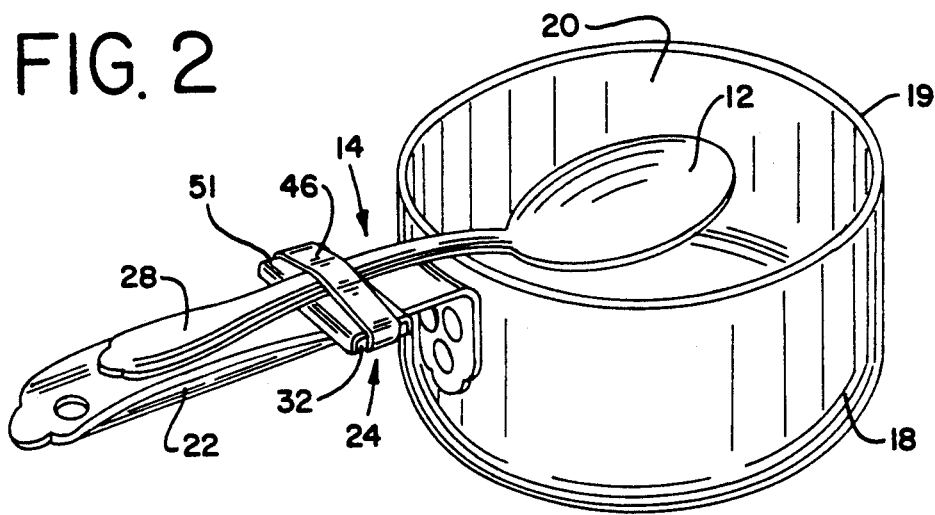
FIG. 2 is a perspective view of a second embodiment of a utensil holder for a container handle made in accordance with the invention.

In the embodiment shown in FIG. 2, the mount 24 has a U-shaped base 51 within which a magnet 32 of sufficient magnetic strength to support the utensil on the handle 22 is received. An elastic loop 46 is carried by the base 51 within which the handle 28 of the utensil 14 is releasably grasped and held. The magnet 32 holds the mount 24 to the ferrous handle 22. The utensil handle 28 is simply slipped under loop 46 which holds utensil 14 in the preferred cantilever manner, and is readily engaged or disengaged.

Figure 3:
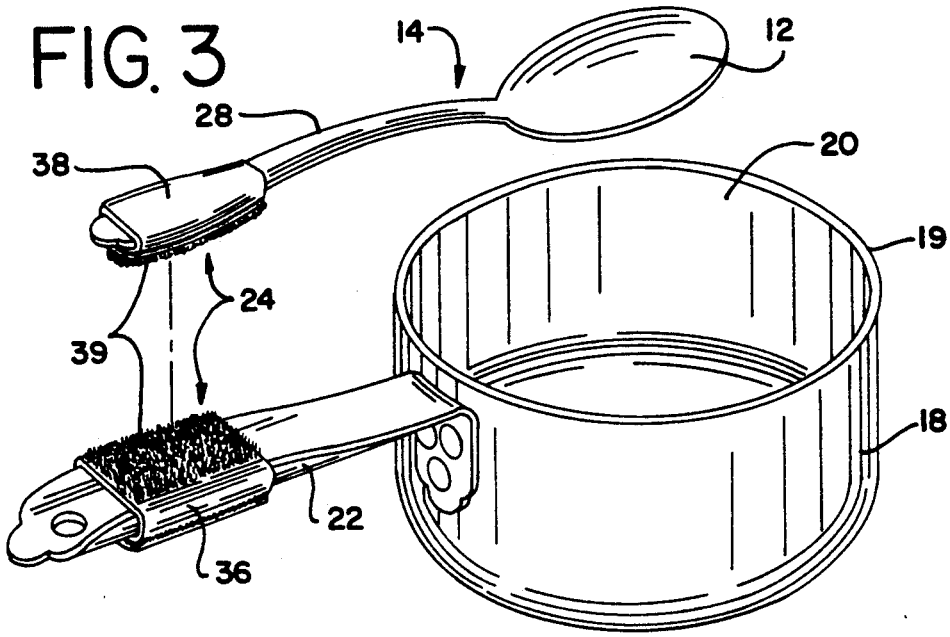
FIG. 3 is a perspective view of a third embodiment of a utensil holder for a container handle made in accordance with the invention.

The mount of FIG. 3 has a first band 36 which is wrapped about the container handle 22. A second band 38 is wrapped about the handle of the utensil. Each of the bands 36 and 38 include a section of interengagable hook and loop fastening material 39 which attaches the bands 36 and 38 together. Interengagable hook and loop fastening material is defined to include material made with both a surface of affixing hooks and a complimentary surface of a clinging pile/loops whereby matching strips can be pressured together for easy fastening and unfastening, e.g., Velcro.

Alternatively, the bands 36 and 38 could include any kind of interengagable element, such as a section of material susceptible to magnetic attraction on one band with the other including a magnet, which attaches the bands 36 and 38 together. Bands 36 and 38 can be constructed of elastic, rubber or other similar materials, or can be non-elastic bands with ends that fasten together. The term "elastic" is meant to include such materials which generally spring back to their original shape after being stretched, deformed, flexed or expanded.

Turning now to the embodiment of FIG. 4, the mount 24 is formed integral with the container handle 22, such as in or positioned on top of handle 22. The utensil handle 28 includes a material susceptible to magnetic attraction and mount 24 is a magnet 32 having sufficient magnetic strength to support the utensil 14 on the handle 22. The magnet 32 could alternatively be formed integral with the utensil handle 28 to attach to an iron-bearing handle or container rim 19.

Two clip-type embodiments are shown in FIG. 5. One mount is an elastic clip 25 attached to the container handle 22. For example, clamp or clip 25 is secured to handle 22, as by elastic fastener 23. A clip 25' clasps utensil handle 28, and is secured to the container rim 19 by spaced apart projections 33. Clips 25 and 25' each have spaced apart clip wings 34 and 34' respectively, to grasp and hold the utensil handle 28 and enable the handle 28 to be easily attached or removed from the container handle 22. The clips 25 and 25' in FIG. 5 would not be used together, since only one clip would be needed.

As shown in FIG. 6, a spring clamp 27 has an open end which allows the utensil handle 28 to be easily attached or removed from the handle 22. The clip 27 is attached to the container handle 22 by gluing, welding or some other appropriate means.

While the invention has been described in relation to particular embodiments, those skilled in the art will recognize various modifications of structure elements, material and the like which may further facilitate application of the invention, while still falling within the scope of the invention.

What is claimed is:

1. A holder for supporting a utensil above a container opening, comprising:
   (a) a utensil mount secured to the container, wherein said mount further comprises a first band which is wrapped about the container handle, and said means carried by said mount comprises a second band which is wrapped about said one end of the utensil, said bands each further including a section of interengagable hook and loop fastening material thereon to attach said bands together;
   (b) means carried by said mount to releasably grasp and hold one end of the utensil in a manner to position the other end of the utensil over the opening of the container; and
   (c) wherein said container includes a handle adjacent the opening of the container and said mount additionally comprises a mechanical fastener to releasably secure the mount to the handle.

2. The holder of claim 1, wherein said utensil is a spoon.

3. The holder of claim 1, wherein said container is a pot.

4. The holder of claim 1, wherein said container is a pan.

5. A cooking implement comprising:
   (a) a container having an opening;
   (b) a handle formed adjacent said container opening; and
   (c) means affixed to said handle for holding one end of a utensil over said container opening, wherein said means for holding one end of a utensil over said container includes a utensil mount secured to the container handle; and means carried by said mount to releasably grasp and hold one end of the utensil in a manner to cantilever the other end of the utensil over the opening of the container, and
   (d) wherein said mount further comprises a first band which is wrapped about the container handle, and said means carried by said mount comprises a second band which is wrapped about said one end of the utensil, said bands each further including a section of interengagable hook and loop fastening material thereon to attach said bands together.

6. The holder of claim 5, wherein said utensil is a spoon.

7. The holder of claim 5, wherein said container is a pot.

8. The holder of claim 5, wherein said container is a pan.

* * * * *